(No Model.)
W. KENFIELD & H. M. STILWELL.
BICYCLE LOCK.
No. 276,600. Patented May 1, 1883.
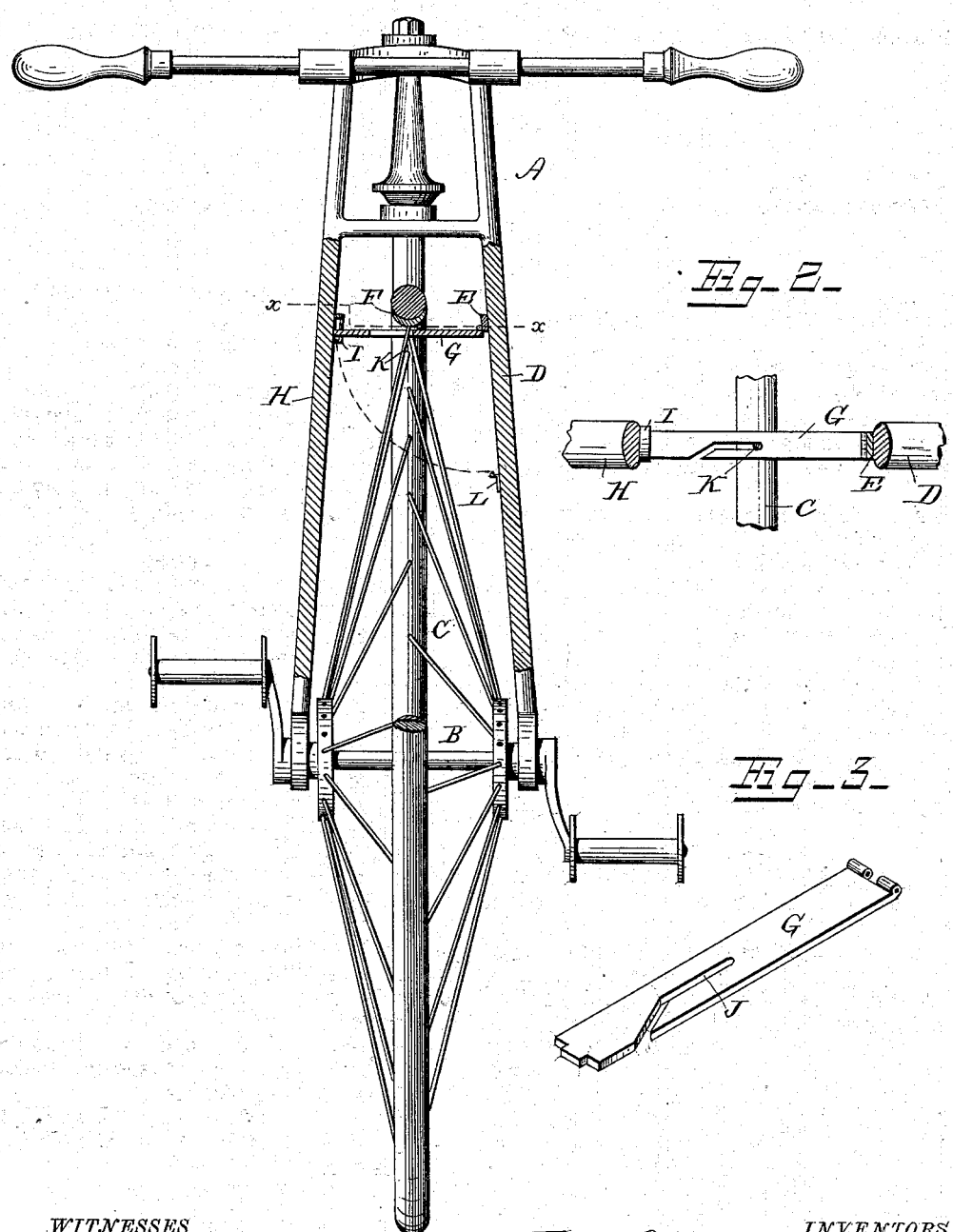
WITNESSES
INVENTORS

United States Patent Office.

WILLIAM KENFIELD AND HENRY M. STILWELL, OF ROCHESTER, NEW YORK, ASSIGNORS TO IDA STILWELL, OF SAME PLACE.

BICYCLE-LOCK.

SPECIFICATION forming part of Letters Patent No. 276,600, dated May 1, 1883.

Application filed November 13, 1882. (No model.)

*To all whom it may concern:*

Be it known that we, WILLIAM KENFIELD and HENRY M. STILWELL, citizens of the United States, residing at Rochester, in the county of Monroe and State of New York, have invented a new and useful Bicycle-Lock, of which the following is a specification, reference being had to the accompanying drawings.

Figure 1 is a vertical sectional view taken through the front fork of a bicycle having our improved lock attachment. Fig. 2 is a horizontal sectional view on the line $x\,x$, and Fig. 3 is a detail view of the hasp.

The same letters refer to the same parts in all the figures.

This invention relates to an improved bicycle-lock or device for securing the front wheel of bicycles when not in use; and it consists in the improved construction and arrangement of parts, which will be hereinafter fully described, and particularly pointed out in the claims.

In the drawings hereto annexed, A represents the front fork of an ordinary bicycle, having bearings for the axle B of the front wheel, C.

To the inside of one of the arms D of the fork A is secured a plate or bracket, E, slightly below the level of the rim F of wheel C.

To the lower edge of the plate or bracket E is hinged a hasp, G, of sufficient length to reach, when raised to a horizontal position, from the arm D to the opposite arm, H, of the fork A, where it engages a suitably-constructed lock, I, which is permanently attached to the said arm H. In the construction of this lock no novelty is claimed, and the end of the hasp engaging it may be constructed in any suitable manner to correspond with the kind of lock used. The hasp G is provided with a slot, J, extending from its center for a short distance toward its free end, and from thence to its edge, as shown. Said slot, when the hasp is raised, receives one of the spokes K of the large wheel A and holds the same securely, thus preventing the wheel from revolving.

The hasp G, when not in use, may be secured in position alongside the arm D by a suitable catch, L.

We claim as our invention—

1. The combination, with the front fork of a bicycle, of a slotted hasp hinged to one arm of said fork, and a lock secured permanently to the other arm and adapted to engage said hasp, as set forth.

2. The combination, with the front fork of a bicycle, of the hinged hasp having a slot extending from its center for a short distance toward its free end, and from thence to the edge of said hasp, as set forth.

3. The combination, with the front fork of a bicycle having a hinged slotted hasp and a lock, as herein described, of a catch adapted to hold the said hasp when not in use, as set forth.

4. The combination, with the front fork of a bicycle, of a hinged hasp adapted to engage and hold one of the spokes of the large wheel, as set forth.

In testimony that we claim the foregoing as our own we have hereto affixed our signatures in presence of two witnesses.

WILLIAM KENFIELD.
    HENRY M. STILWELL.

Witnesses:
 JAMES COCHRANE,
 JOHN WHITLEY.